US009261430B2

(12) United States Patent
Kamiya

(10) Patent No.: US 9,261,430 B2
(45) Date of Patent: Feb. 16, 2016

(54) PERFORMANCE ESTIMATION METHOD AND SCALE-UP METHOD FOR PARTICLE SIZE BREAKUP APPARATUS OF A ROTOR-STATOR TYPE

(75) Inventor: Tetsu Kamiya, Odawara (JP)

(73) Assignee: MEIJI CO., LTD., Koutou-Ku, Tokyo (JP)

( * ) Notice: Subject to any disclaimer, the term of this patent is extended or adjusted under 35 U.S.C. 154(b) by 425 days.

(21) Appl. No.: 13/817,649

(22) PCT Filed: Aug. 19, 2011

(86) PCT No.: PCT/JP2011/068777

§ 371 (c)(1), (2), (4) Date: Apr. 9, 2013

(87) PCT Pub. No.: WO2012/023608

PCT Pub. Date: Feb. 23, 2012

(65) Prior Publication Data

US 2013/0218348 A1 Aug. 22, 2013

(30) Foreign Application Priority Data

Aug. 19, 2010 (JP) ................................ 2010-184466

(51) Int. Cl.
*B01F 5/16* (2006.01)
*G01M 13/00* (2006.01)
(Continued)

(52) U.S. Cl.
CPC ............... *G01M 13/00* (2013.01); *B01F 5/104* (2013.01); *B01F 5/165* (2013.01); *B01F 7/164* (2013.01); *B01F 2215/0404* (2013.01); *B01F 2215/0409* (2013.01)

(58) Field of Classification Search
CPC .... B01F 7/0075; B01F 7/008; B01F 7/00808; B01F 7/00816; B01F 7/00833; B01F 5/104; B01F 7/164; B01F 2215/0404; B01F 2215/0409; B01F 5/165; G01M 13/00
USPC ......................... 366/264, 302, 304, 305, 286
See application file for complete search history.

(56) References Cited

U.S. PATENT DOCUMENTS 1,873,199 A * 8/1932 Haskell ...................... 241/259.1
1,997,032 A * 4/1935 Alstad et al. .................... 99/453
(Continued)

FOREIGN PATENT DOCUMENTS

EP 2745920 A4 * 7/2015 ................ B01F 5/10
JP 10-226981 A 8/1998
(Continued)

OTHER PUBLICATIONS

International Search Report (PCT/ISA/210) issued on Dec. 6, 2011, by the Japanese Patent Office as the International Searching Authority for International Application No. PCT/JP2011/068777.
(Continued)

*Primary Examiner* — Charles Cooley
(74) *Attorney, Agent, or Firm* — Buchanan Ingersoll & Rooney PC

(57) ABSTRACT

A comprehensive mixer performance estimation method that can be applied to each of the mixers of the rotor-stator type having the various configurations and circulation modes is provided. In accordance with the mixer performance estimation method of the present invention, the total energy dissipation rate $\epsilon_a$ for the mixers of the rotor-stator type may be obtained, the respective sizes of the rotor-stator and the powers and flow rates during the mixer's running time may be measured, the magnitude of the values for the configuration dependent term for the entire mixer that are specific to each of the mixers and are obtained by measuring the size of the rotor-stator and the powers and flow rates during the mixer's running time may be estimated, and the mixer's performance may be estimated.

3 Claims, 11 Drawing Sheets

Relationship between Average Liquid Drop Diameter and Total Energy Dissipation Rate for Mixer C (Stators No. 1 to No.5)

(51) Int. Cl.
*B01F 5/10* (2006.01)
*B01F 7/16* (2006.01)

(56) References Cited

U.S. PATENT DOCUMENTS

| | | | | | |
|---|---|---|---|---|---|
| 2,169,339 | A | * | 8/1939 | Ditto | 366/305 |
| 2,591,966 | A | * | 4/1952 | Rider | 366/286 |
| 3,194,540 | A | * | 7/1965 | Hager | 366/305 |
| 3,195,867 | A | * | 7/1965 | Mould, Jr. | 366/305 |
| 3,224,689 | A | * | 12/1965 | Behrens et al. | 241/244 |
| 3,514,079 | A | * | 5/1970 | Little, Jr. | 366/305 |
| 3,658,266 | A | * | 4/1972 | O'Keefe et al. | 241/101.2 |
| 3,982,700 | A | * | 9/1976 | Love | 241/46.11 |
| 5,088,831 | A | * | 2/1992 | Reinhall | 366/171.1 |
| 5,902,042 | A | * | 5/1999 | Imaizumi et al. | 366/176.2 |
| 6,000,840 | A | * | 12/1999 | Paterson | 366/264 |
| 8,851,741 | B2 | * | 10/2014 | Ganmor et al. | 366/171.1 |
| 8,911,141 | B2 | * | 12/2014 | Cheio De Oliveira et al. | 366/164.6 |
| 8,960,993 | B2 | * | 2/2015 | Cheio De Oliveira et al. | 366/139 |
| 2003/0152500 | A1 | * | 8/2003 | Dalziel et al. | 422/245.1 |
| 2004/0187770 | A1 | * | 9/2004 | Calabrese | A23J 3/16 117/200 |
| 2004/0242764 | A1 | | 12/2004 | Yamada et al. | |
| 2005/0242218 | A1 | | 11/2005 | Nakano et al. | |
| 2010/0086469 | A1 | | 4/2010 | Tennison et al. | |
| 2010/0098615 | A1 | | 4/2010 | Tennison et al. | |
| 2011/0026358 | A1 | * | 2/2011 | Cheio De Oliveira et al. | 366/139 |
| 2012/0093906 | A1 | * | 4/2012 | Ganmor et al. | 424/405 |
| 2013/0186970 | A1 | * | 7/2013 | Hagata | B01F 5/104 239/7 |
| 2013/0215711 | A1 | * | 8/2013 | Kamiya | 366/343 |
| 2013/0218348 | A1 | * | 8/2013 | Kamiya | 700/275 |
| 2013/0226521 | A1 | * | 8/2013 | Kamiya | 702/182 |
| 2013/0315026 | A1 | * | 11/2013 | Cheio De Oliveira et al. | 366/134 |
| 2014/0192614 | A1 | * | 7/2014 | Kamiya | 366/302 |

FOREIGN PATENT DOCUMENTS

| | | | |
|---|---|---|---|
| JP | 2004-002732 | A | 1/2004 |
| JP | 2004-008898 | A | 1/2004 |
| JP | 2005-506174 | A | 3/2005 |
| JP | 2010-510947 | A | 4/2010 |
| JP | 2010-511064 | A | 4/2010 |

OTHER PUBLICATIONS

Written Opinion (PCT/ISA/237) issued on Dec. 6, 2011, by the Japanese Patent Office as the International Searching Authority for International Application No. PCT/JP2011/068777.

* cited by examiner

Fig.1 (--Prior Art--)
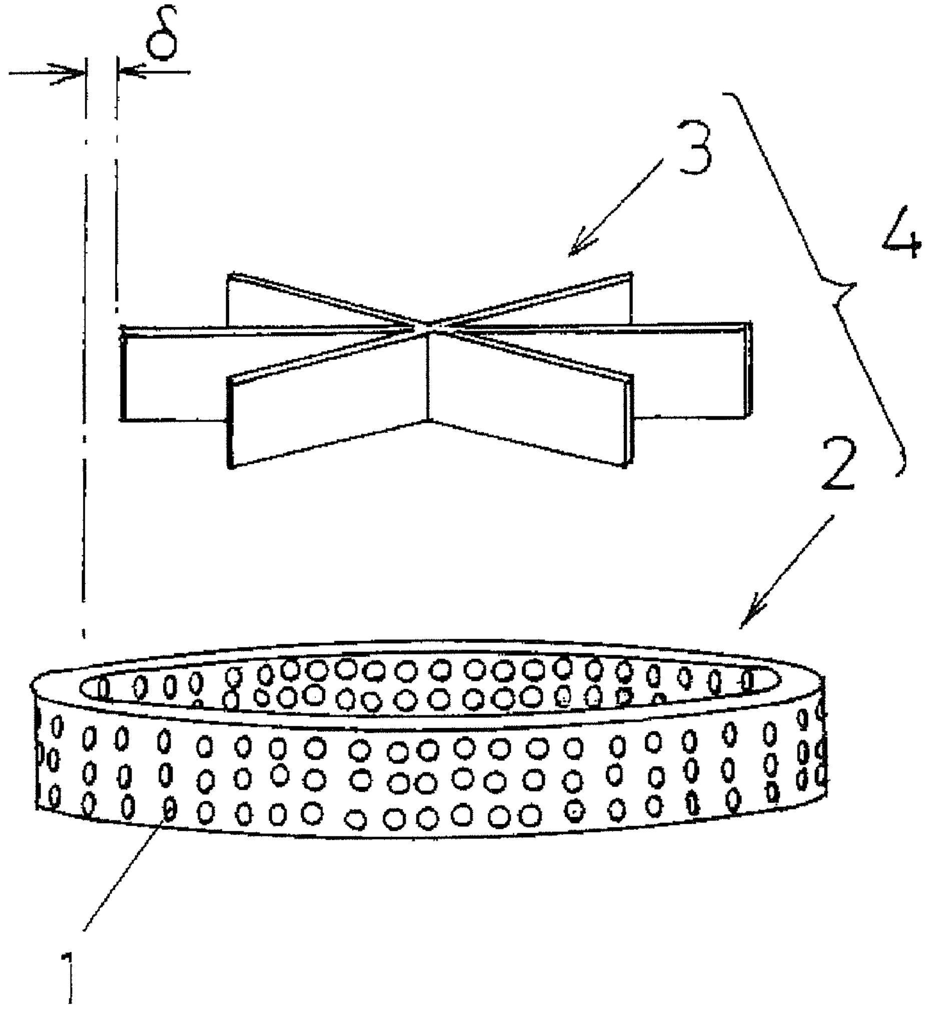

Fig.2 (--Prior Art--)
External Circulation
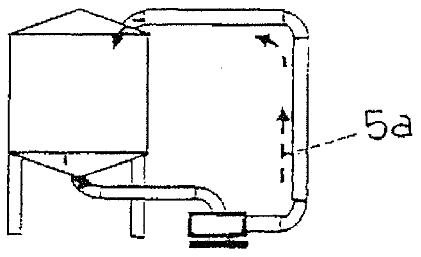
Internal Circulation
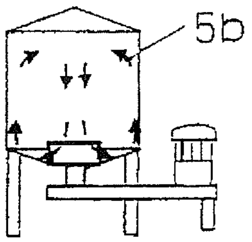

Fig.3 (--Prior Art--)
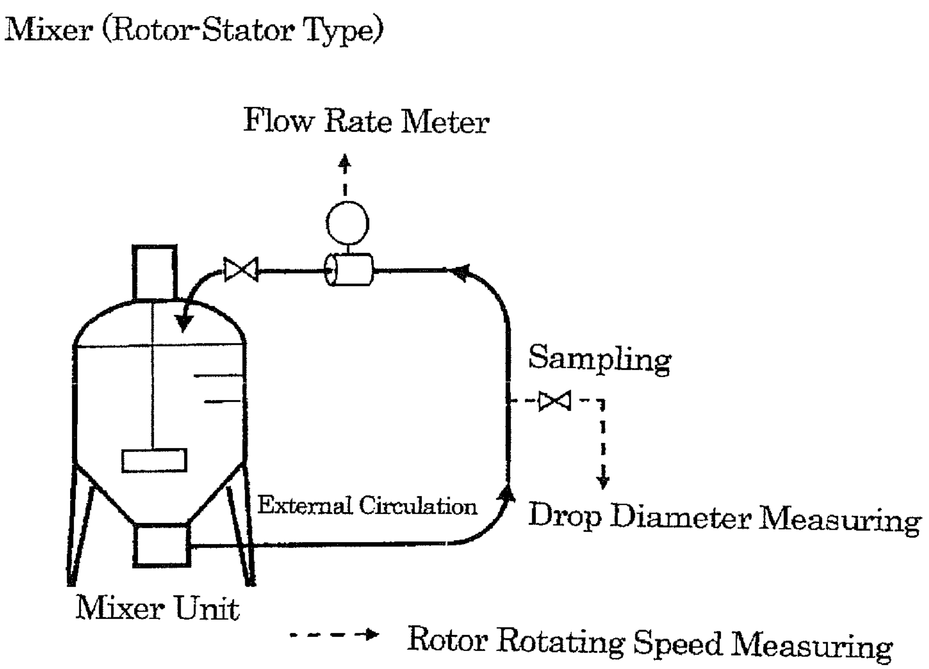
Fig.4 (--Prior Art--)
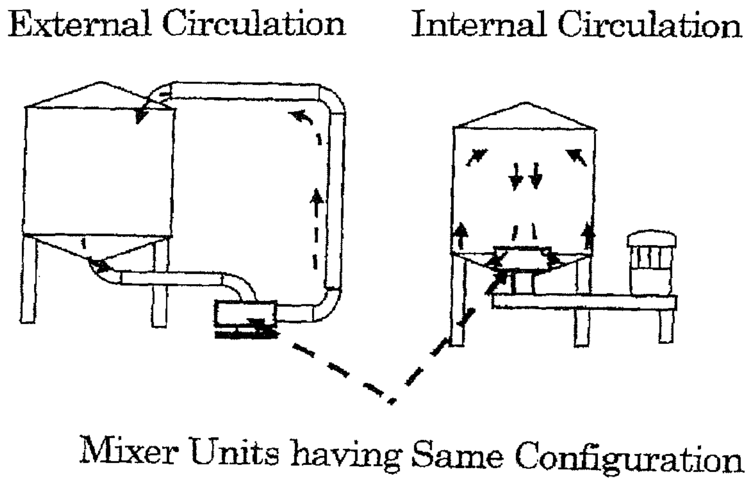

Relationship between Processing (Mixing) Time and Drop Diameter for Mixers A-1 and A-2

○ $u$ = 27 m/s, $\delta$ = 0.25mm; ● $u$ = 27 m/s, $\delta$ = 0.15mm

△ $u$ = 21 m/s, $\delta$ = 0.25mm; ▲ $u$ = 21 m/s, $\delta$ = 0.15mm

□ $u$ = 13 m/s, $\delta$ = 0.25mm; ■ $u$ = 13 m/s, $\delta$ = 0.15mm

Relationship between Mean Drop Diameter and Total Energy Dissipation Rate for Mixer A-1 and A-2

Relationship between Mean Drop Diameter and Total Energy Dissipation Rate for Mixer B Relationship between Mixing Time and Liquid Drop Diameter under Running Conditions in Table 8 for Mixer C (Stators No. 1 to No.5)

Relationship between Average Liquid Drop Diameter and Total Energy Dissipation Rate for Mixer C (Stators No. 1 to No.5)

Relationship between Mean Drop Diameter and Total Energy Dissipation Rate for Mixers D and E Estimated Value and Actual Measured Value calculated from Equivalent Mixing Time

PERFORMANCE ESTIMATION METHOD AND SCALE-UP METHOD FOR PARTICLE SIZE BREAKUP APPARATUS OF A ROTOR-STATOR TYPE

BACKGROUND

1. Technical Field

The present invention relates to the performance estimation and scale-up methods for the mixer of the so-called rotor-stator type, and more specifically to the mixer that includes a stator having a plurality of openings (holes) and a rotor that is disposed on the inner side of the stator and spaced by a predetermined gap away from the stator.

2. Background

As shown in FIG. 1, it is general that the mixer of the so-called rotor-stator type comprises a mixer unit 4 that includes a stator 2 having a plurality of openings (holes) 1 and a rotor 3 disposed on the inner side of the stator 2 and spaced by a particular gap δ from the stator 2. Such mixer of the rotor-stator type is provided for subjecting the fluid or liquid being processed to the emulsification, dispersion, particle size breakup, mixing or any other similar process, by taking advantage of the fact that a high shear stress may be produced in the neighborhood of the gap between the stator 3 capable of rotating at high-speeds and the stator 2 being fixed in position. This mixer may be used for mixing or preparing the fluid or liquid being processed, and has a wide variety of applications in which foods, pharmaceutical medicines, chemical products and the like can be manufactured.

The mixer of the rotor-stator type may be classed according to the type of the circulation mode for the fluid or liquid being processed, that is, one type being the externally circulated mixer in which the fluid or liquid being processed may be circulated in the direction indicated by the arrow 5*a* in FIG. 2, and the other type being the internally circulated mixer in which the fluid or liquid being processed may be circulated in the direction indicated by the arrow 5*b* in FIG. 2.

For the mixer of the rotor-stator type mentioned above, many different configurations and circulation modes or systems have been proposed. For example, the Japanese patent application No. 2006-506174 discloses the rotor and stator apparatus and method for forming the particle sizes, and proposes the particle size breakup apparatus and method for forming the particle sizes using the mixer which will be described below. Specifically, the mixer includes the stator having a plurality of openings (holes) and the rotor disposed on the inner side of the stator and spaced by a particular gap away from the stator, and can be used widely in the manufacturing fields, such as the pharmaceutical medicines, nutrition supplement foods, other foods, chemical products, cosmetics and the like. Using the apparatus and method described above, the mixer can be scaled up in the efficient, simple and easy manner.

For those past years, several indices (theories) have been reported as the performance estimation methods for the mixers having the different configurations.

Not only for the mixer of the rotor-stator type as described above but also for all other type mixers, it is reported that, when the liquid-to-liquid dispersion in particular is performed, for example, the drop diameter sizes can be discussed in terms of the magnitude of the values that can be obtained by calculating the average energy dissipation rate (Publications 1 and 2). In those publications 1 and 2, however, the method for calculating the average energy dissipation rates is not disclosed specifically.

The publications 3 to 6 report several study cases that may be applied to each individual mixer and in which the results obtained by making the experiments on those individual mixers have been arranged or organized into the graphical chart. In those study cases (Publications 3 to 6), however, it is considered that the mixer's particle size breakup effect is only affected by the particular gap between the rotor and stator and by the openings (holes) on the stator. It is only described that this differs for each different type mixer.

Several study cases are also reported (Publications 7 and 8), in which the particle size breakup mechanism for the mixer of the rotor-stator type was considered and discussed. In those publications 7 and 8, it is suggested that the energy dissipation rates of the turbulent flow will contribute to the particle size breakup effect for the liquid drop, and this particle size breakup effect may be affected by the frequency (shear frequency) of the turbulent flow when the fluid or liquid is placed under the shear stress of the fluid or liquid being processed.

For the scale-up method for the mixer of the rotor-stator type, there are several reports (Publication 9) in which the final resulting drop diameter (maximum stable diameter) can be obtained during the long-time mixer running period. This, however, is not practical in the actual production sites and is of no utility. Specifically, there are no reports regarding the study cases in which the processing (agitation and mixing) time of the mixer is the object for consideration, and those study cases are not useful enough to estimate the resulting drop diameters that can be obtained during the particular mixer running period. Although it is reported that the resulting drop diameters may be estimated by considering the mixer processing time, yet it is only reported that the phenomenon (factual action) is based on the actual measured values (experimental values). In those study cases, such phenomenon is not analyzed theoretically.

The following publication, which is the document related to the patent application, is cited herein for reference:

Japanese Patent Application No. 2005-506174

The following publications, which are not related to the patent application, are cited herein for reference:

(1) David, J. T.; "Drop Sizes of Emulsions Related to Turbulent Energy Dissipation Rates", Chem. Eng. Sci., 40, 839-842 (1985) and David J. T.; "A Physical Interpretation of Drop Sizes in Homogenizers;
(2) Davies, J. T.; "A Physical Interpretation of Drop Sizes in Homogenizers and Agitated Tanks, Including the Dispersion of Viscous Oils", Chem. Eng. Sci., 42, 1671-1676 (1987);
(3) Calabrese, R. V., M. K. Francis, V. P. Mishra and S. Phongikaroon; "Measurement and Analysis of Drop Size in Batch Rotor-Stator Mixer", Proc. 10th European Conference on Mixing, pp. 149-156, Delft, the Netherlands (2000);
(4) Calabrese, R. V., M. K. Francis, V. P. Mishra, G. A. Padron and S. Phongikaroon; "Fluid Dynamic and Emulsification in High Shear Mixers", Proc. 3rd World Congress on Emulsion, pp. 1-10, Lyon, France (2002);
(5) Maa, Y. F., and C. Hsu, and C. Hsu; "Liquid-Liquid Emulsification by Rotor/Stator Homogenization", J. Controlled. Release, 38, 219-228 (1996);
(6) Barailler, F., M. Heniche and P. A. Tanguy; "CFD Analysis of a Rotor-Stator Mixer with Viscous Fluids", Chem. Eng. Sci., 61, 2888-2894 (2006);
(7) Utomo, A. T., M. Baker and A. W. Pacek; "Flow Pattern, Periodicity and Energy Dissipation in a Batch Rotor-Stator Mixer", Chem. Eng. Res. Des., 86, 1397-1409 (2008);

(8) Porcelli, J.; “The Science of Rotor-Stator Mixers”, Food Process, 63, 60-66 (2002);

(9) Urban, K.: “Rotor-Stator and Disc System for Emulsification Processes”, Chem. Eng. Technol., 29, 24-31 (2006)

SUMMARY OF THE INVENTION

In the patent application cited above, the superiority (performance) of the particular mixer and the value range of the design on which such mixer is based are disclosed, but the theoretical grounds on which the value range of the high-performance mixer design is based are not described. The information on the type and configuration of the high performance mixer is not provided specifically.

It may be appreciated from the above description that, for those past years, several indices (theories) have been reported as the performance estimation method for the mixers having the different configurations. In most cases, however, those indices can only be applied to each individual mixer having the same configuration. In the actual cases, however, they cannot be applied to the mixers of the various types having the different configurations. Although there are the indices that can only be applied to those mixers in which the gap between the rotor and stator will largely affect the particle size breakup effect or the indices that can only be applied to those mixers in which the opening (hole) of the stator will affect the particle size breakup effect or there are the indices that can be applied to those mixers that have all possible configurations are not discussed consistently. There are no indices that can be applied to the mixers having all possible configurations.

As noted above, there are almost no study cases in which the performance estimation method and scale-up method for those mixers of the rotor-stator type have been defined. There are also no study cases in which those methods can be applied to the mixers of the various types having the different configurations, and the data on the results obtained by the experiments on such study cases have not been arranged or organized into the graphical chart.

For the performance estimation method and scale-up method for the mixers of the rotor-stator type according to the prior art, in most cases, the final drop diameters (maximum stable drop diameters) were obtained by using the small scale device for each individual mixer and permitting the device to run for the long time period so that final drop diameters could be estimated. More specifically, in the prior art, there is no estimation method that can be used to estimate the drop diameters that would be obtained by using the large-scale devices (actual production installation) for the mixers of the various types and permitting such large-scale devices to run during the particular time period, or there is no estimation method that can be used to estimate the particular drop diameters obtained during the particular running time or during the processing (agitating) time required until such particular drop diameters can be obtained.

Although there are the indices that can only be applied to the mixer in which the size of the gap between the rotor and stator may largely affect the particle size breakup effect or emulsification effect, or although there are the indices that can only be applied to the mixer in which the size or configuration of the opening (hole) of the stator may largely affect the particle size breakup effect or emulsification effect, the comprehensive indices that can be applied to all of the mixers having the different configurations (the theories on which the various types of mixers can be compared or estimated consistently) were not discussed. This means that there are no indices that consider the above situations.

For the above reason, the performance of the mixer was actually estimated on the error and trial basis using the actual liquid being processed, and the mixers were then scaled up accordingly.

It is, therefore, the object of the present invention to provide a comprehensive performance estimation method that can be established so that it can be applied to the mixers of the various types having the various configurations that are likely to be affected mostly by the gap in particular between the rotor and stator, or it can be applied to the mixers of the various types having the different circulation modes or systems, thereby providing the design method that is established by taking the running conditions (processing time) for such mixers into consideration and to provide the manufacturing method (particle size breakup method) that is established so that it can be used for manufacturing the foods, pharmaceutical medicines and the like by using the above described performance estimation method and design method.

In a first aspect of the invention as defined in Claim 1, it is characterized by the fact that a method for estimating the mixer of the rotor-stator type is provided, wherein the method includes the steps of: obtaining the total energy dissipation rate $\epsilon_a$ by using the Equation 1 given below, measuring the size of the rotor-stator and the power and flow rate during the mixer's running time which are included in the Equation 1 as the components thereof, estimating the magnitude of the values for the entire mixer that are specific to each of the mixers and obtained in the measuring step and estimating the performance of the mixer:

$$\begin{aligned}\varepsilon_a &= \varepsilon_g + \varepsilon_s \\ &= [(N_p - N_{qd}\pi^2)\cdot n_r]\left\{D^3\left[\left(\frac{D^3 b}{\delta(D+\delta)}\right) + \frac{\pi^2 n_s^2 d^3(d+4l)}{4N_{qd}[n_s\cdot d^2 + 4\delta(D+\delta)]}\right]\right\}\left(\frac{N^4\cdot t_m}{V}\right) \\ &= [(N_p - N_{qd}\pi^2)\cdot n_r]\cdot[D^3(K_g + K_s)]\cdot\left(\frac{N^4\cdot t_m}{V}\right) \\ &= K_c\cdot\left(\frac{N^4\cdot t_m}{V}\right)\end{aligned} \qquad \text{Equation 1}$$

In the Equation 1, $\epsilon_a$: Total energy dissipation rate ($m^2/s^3$)

$\epsilon_g$: Local shear stress in the gap between the rotor and stator ($m^2/s^3$)

$\epsilon_s$: Local energy dissipation rate in the stator ($m^2/s^3$)

$N_p$: Number of powers (–)

Nqd: Number of flow rates (–)

$n_r$: Number of rotor blades (–)

D: Diameter of rotor (m)

b: Thickness of rotor blade tip (m)

δ: Gap between rotor and stator (m)

$n_s$: Number of stator holes (–)

d: Diameter of stator hole (m)

l: Thickness of stator (m)

N: Number of rotations (l/s)

$t_m$: Mixing time (s)

V: Flow rate ($m^3$)

$K_g$: Configuration dependent term ($m^2$)

$K_s$ Configuration dependent term in stator ($m^2$)

$K_c$: Configuration dependent term for the entire mixer

In a second aspect of the invention as defined in claim 2, it is characterized by the fact that a method of scaling up or scaling down the mixer of the rotor-stator type is provided, wherein the method includes the steps of:

obtaining the value for the total energy dissipation rate $\epsilon_a$ on the experimental mixer installation and/or the pilot plant mixer installation by using the Equation 1 given below;

obtaining the value for the total energy dissipation rate $\epsilon_a$ measured on the actual mixer installation; and matching the value $\epsilon_a$ obtained on the experimental mixer installation and/or pilot plant mixer installation to the value $\epsilon_a$ measured on the actual mixer installation:

$$\begin{aligned}\varepsilon_a &= \varepsilon_g + \varepsilon_s \qquad \text{Equation 1}\\ &= [(N_p - N_{qd}\pi^2)\cdot n_r]\left\{D^3\left[\left(\frac{D^3 b}{\delta(D+\delta)}\right) + \frac{\pi^2 n_s^2 d^3(d+4l)}{4N_{qd}[n_s\cdot d^2 + 4\delta(D+\delta)]}\right]\right\}\left(\frac{N^4\cdot t_m}{V}\right)\\ &= [(N_p - N_{qd}\pi^2)\cdot n_r]\cdot[D^3(K_g+K_s)]\cdot\left(\frac{N^4\cdot t_m}{V}\right)\\ &= K_c\cdot\left(\frac{N^4\cdot t_m}{V}\right)\end{aligned}$$

In the Equation 1, $\epsilon_a$: Total energy dissipation rate ($m^2/s^3$)

$\epsilon_g$: Local shear stress in the gap between the rotor and stator ($m^2/s^3$)

$\epsilon_s$: Local energy dissipation rate in the stator ($m^2/s^3$)

$N_p$: Number of powers (−)

Nqd: Number of flow rates (−)

$n_r$: Number of rotor blades (−)

D: Diameter of rotor (m)

b: Thickness of rotor blade tip (m)

δ: Gap between rotor and stator (m)

$n_s$: Number of stator holes (−)

d: Diameter of stator hole (m)

l: Thickness of stator (m)

N: Number of rotations (l/s)

$t_m$: Mixing time (s)

V: Flow rate (me)

$K_g$: Configuration dependent term ($m^2$)

$K_s$ Configuration dependent term in stator ($m^2$)

$K_c$: Configuration dependent term for the entire mixer

In a third aspect of the invention as defined in Claim 3, it is characterized by the fact that a method for manufacturing the foods, pharmaceutical medicines or chemical products by subjecting a fluid or fluid or liquid being processed to the emulsification, dispersion, particle size breakup, mixing or any other similar process by using the mixer of the rotor-stator type is provided, wherein the method includes the steps of:

calculating the Equation 1 given below to estimate the mixer's running time and the resulting drop diameters to be obtained during the mixer's running time for the fluid or liquid being processed; and manufacturing the foods, pharmaceutical medicines or chemical products:

$$\begin{aligned}\varepsilon_a &= \varepsilon_g + \varepsilon_s \qquad \text{Equation 1}\\ &= [(N_p - N_{qd}\pi^2)\cdot n_r]\left\{D^3\left[\left(\frac{D^3 b}{\delta(D+\delta)}\right) + \frac{\pi^2 n_s^2 d^3(d+4l)}{4N_{qd}[n_s\cdot d^2 + 4\delta(D+\delta)]}\right]\right\}\left(\frac{N^4\cdot t_m}{V}\right)\end{aligned}$$

-continued $$\begin{aligned}&= [(N_p - N_{qd}\pi^2)\cdot n_r]\cdot[D^3(K_g+K_s)]\cdot\left(\frac{N^4\cdot t_m}{V}\right)\\ &= K_c\cdot\left(\frac{N^4\cdot t_m}{V}\right)\end{aligned}$$

In the Equation 1, $\epsilon_a$: Total energy dissipation rate ($m^2/s^3$)

$\epsilon_g$: Local shear stress in the gap between the rotor and stator ($m^2/s^3$)

$\epsilon_s$: Local energy dissipation rate in the stator ($m^2/s^3$)

$N_p$: Number of powers (−)

Nqd: Number of flow rates (−)

$n_r$: Number of rotor blades (−)

D: Diameter of rotor (m)

b: Thickness of rotor blade tip (m)

δ: Gap between rotor and stator (m)

$n_s$: Number of stator holes (−)

d: Diameter of stator hole (m)

l: Thickness of stator (m)

N: Number of rotations (l/s)

$t_m$: Mixing time (s)

V: Flow rate ($m^3$)

$K_g$: Configuration dependent term ($m^2$)

$K_s$ Configuration dependent term in stator ($m^2$)

$K_c$: Configuration dependent term for the entire mixer

In a fourth aspect of the invention as defined in Claim 4, it is characterized by the fact that the foods, pharmaceutical medicines or chemical products manufactured by using the mixer of the rotor-stator type and by subjecting the fluid or liquid being processed to the emulsification, dispersion, particle size breakup, mixing or any other similar process are provided, wherein the foods, pharmaceutical medicines or chemical products are manufactured by using the Equation 1 given below to estimate the running time of the mixer of the rotor-stator type and the resulting drop diameters obtained during the mixer running time:

$$\begin{aligned}\varepsilon_a &= \varepsilon_g + \varepsilon_s \qquad \text{Equation 1}\\ &= [(N_p - N_{qd}\pi^2)\cdot n_r]\left\{D^3\left[\left(\frac{D^3 b}{\delta(D+\delta)}\right) + \frac{\pi^2 n_s^2 d^3(d+4l)}{4N_{qd}[n_s\cdot d^2 + 4\delta(D+\delta)]}\right]\right\}\left(\frac{N^4\cdot t_m}{V}\right)\\ &= [(N_p - N_{qd}\pi^2)\cdot n_r]\cdot[D^3(K_g+K_s)]\cdot\left(\frac{N^4\cdot t_m}{V}\right)\\ &= K_c\cdot\left(\frac{N^4\cdot t_m}{V}\right)\end{aligned}$$

In the Equation 1, $\epsilon_a$: Total energy dissipation rate ($m^2/s^3$)

$\epsilon_g$: Local shear stress in the gap between the rotor and stator ($m^2/s^3$)

$\epsilon_s$: Local energy dissipation rate in the stator ($m^2/s^3$)

$N_p$: Number of powers (−)

Nqd: Number of flow rates (−)

$n_r$: Number of rotor blades (−)

D: Diameter of rotor (m)

b: Thickness of rotor blade tip (m)

δ: Gap between rotor and stator (m)

$n_s$: Number of stator holes (−)

d: Diameter of stator hole (m)

l: Thickness of stator (m)

N: Number of rotations (l/s)

$t_m$: Mixing time (s)

V: Flow rate ($m^3$)

$K_g$: Configuration dependent term ($m^2$)

$K_s$ Configuration dependent term in stator ($m^2$)

$K_c$: Configuration dependent term for the entire mixer

In the performance estimation method and scale up method for the mixer of the rotor-stator mode according to the present invention, the index that is called the total energy dissipation rate $\epsilon_a$ may be used. The total dissipation rate for each of the mixers having the various configurations and circulation modes as offered by each of the corresponding manufacturers may be calculated individually from the particular geometrical sizes of the rotor and stator and the values measured for the particular running powers and flow rates. Then, this total energy dissipation rate $\epsilon_a$ may be expressed separately from the configuration dependent terms and running condition depending terms for each of those mixers.

In the performance estimation method for each of those mixers, that is, in the performance estimation method that may be defined by the particle size breakup trend for the drop diameters, for example, the values (magnitude) for the configuration dependent terms can be used.

In the scale up and scale down method, the values for the total energy dissipation rate $\epsilon_a$ as coupled with the configuration dependent term and running condition dependent term can be used, and the mixer can be designed accordingly by allowing the calculated values to agree with those terms.

In the method for manufacturing the foods, pharmaceutical medicines or chemical products by subjecting the fluid or liquid being processed to the emulsification, dispersion, particle size breakup, mixing or any other similar process that is performed by using the mixer of the rotor-stator type, the particular mixer running time and the drop diameters thus obtained during the particular running time can be estimated by using the Equation 1 proposed by the present invention for deriving the total energy dissipation rate $\epsilon_a$, and the foods (including dairy goods, beverage, etc.), pharmaceutical medicines (including non-medical goods, etc.) or chemical products (including cosmetic articles, etc.) having the desired drop diameters can thus be manufactured.

BRIEF DESCRIPTION OF DRAWINGS

FIG. 1 is a perspective view illustrating the mixer unit which is included in the mixer of the rotor-stator type;

FIG. 2 is a diagram illustrating the mixer of the rotor-stator type that runs in the external circulation mode (externally circulated mixer) and the mixer of the rotor-stator type that runs in the internal circulation mode (internally circulated mixer);

FIG. 3 illustrates the system that allows the particle size breakup trend for the drop diameters to be investigated;

FIG. 4 illustrates the system in which the experimental results on the mixer of the rotor-stator type that runs in the external circulation mode (the externally circulated mixer) can be used to estimate the performance of the mixer of the rotor-stator-type that runs in the internal circulation mode (internal circulated mixer);

BEST MODE OF EMBODYING THE INVENTION

Figure 5:
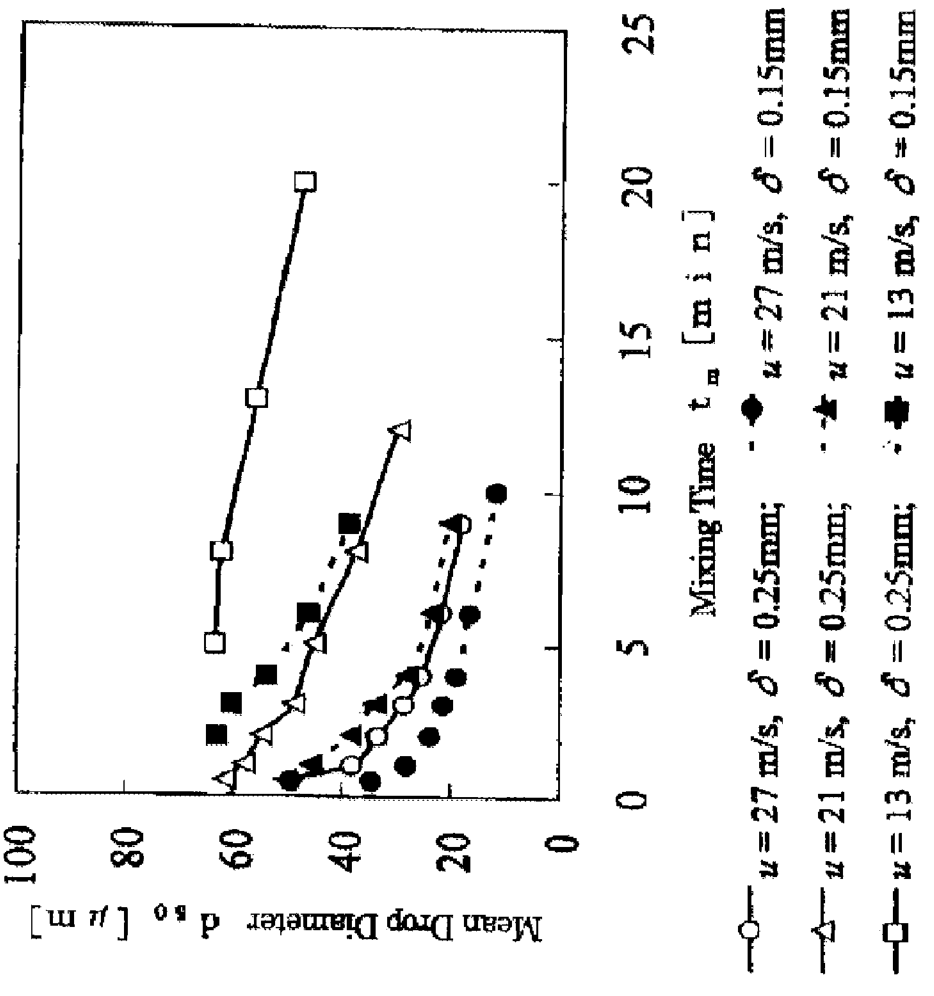
FIG. 5 represents the relationship (particle size breakup trend) between the processing (mixing) time and the resulting drop diameters for the small-scale mixer.

The present invention provides the performance estimation method and scale up (scale down) method for the mixer of the rotor-stator type. In particular, the present invention allows the performance for the mixer to be estimated by grasping the mixer's performance from the particle size breakup trend and the resulting drop diameters.

The present invention allows the total energy dissipation rate $\epsilon_a$ to be derived from the Equation 1 given below.

Equation 1

$$\begin{aligned}
\varepsilon_a &= \varepsilon_g + \varepsilon_s \\
&= [(N_p - N_{qd}\pi^2)\cdot n_r]\left\{D^3\left[\left(\frac{D^3 b}{\delta(D+\delta)}\right) + \frac{\pi^2 n_s^2 d^3 (d+4l)}{4N_{qd}[n_s\cdot d^2 + 4\delta(D+\delta)]}\right]\right\}\left(\frac{N^4\cdot t_m}{V}\right) \\
&= [(N_p - N_{qd}\pi^2)\cdot n_r]\cdot[D^3(K_g + K_s)]\cdot\left(\frac{N^4\cdot t_m}{V}\right) \\
&= K_c\cdot\left(\frac{N^4\cdot t_m}{V}\right)
\end{aligned}$$

In the Equation 1, $\epsilon_a$: Total energy dissipation rate ($m^2/s^3$)

$\epsilon_g$: Local shear stress in the gap between the rotor and stator ($m^2/s^3$)

$\epsilon_s$: Local energy dissipation rate in the stator ($m^2/s^3$)

$N_p$: Number of powers (–)

Nqd; Number of flow rates (–)

$n_r$: Number of rotor blades (–)

D: Diameter of rotor (m)

b: Thickness of rotor blade tip (m)

δ: Gap between rotor and stator (m)

$n_s$: Number of stator holes (–)

d: Diameter of stator hole (m)

l: Thickness of stator (m)

N: Number of rotations (l/s)

$t_m$: Mixing time (s)

V: Flow rate ($m^3$)

$K_g$: Configuration dependent term ($m^2$)

$K_s$ Configuration dependent term in stator ($m^2$)

$K_c$: Configuration dependent term for the entire mixer

According to the present invention, the mixer's performance may be estimated by estimating the magnitude of the values for the configuration dependent term for the entire mixer that are specific to each of the mixers and can be obtained by measuring the respective sizes of the rotor and stator and the running powers and flow rates which are included as the components of the Equation 1 shown above.

As it is clear from the Equation of the present invention that derives the total energy dissipation rate $\epsilon_a$ as described above, the value for the configuration dependent term $K_g$ [−] for the gap is specific to each of the mixers that are based on the gap δ [m] between the rotor and stator, the rotor's diameter D [m], and the thickness of the rotor's blade tip b [m], respectively.

In addition, the value for the configuration depending term $K_s$ [−] for the stator is specific to each of the mixers that are based on the number of flow rates $N_{qd}$ [−], the number of holes in the stator $n_s$ [−], the hole diameter for the stator d [m], the stator's thickness l [m], and the gap between rotor and stator δ [m], respectively.

Furthermore, the value for the configuration dependent term $K_c$ for the entire mixer is specific to each of the mixers that are based on the number of powers $N_p$ [−], the number of flow rates $N_{qd}$ [−], the number of rotor's blades $n_r$ [−], the rotor's diameter D [m], the configuration dependent term $K_g$ [−] for the gap and the configuration dependent term $K_s$ [−], respectively.

Note that the number of powers: NP[−] and the number of flow rates: $N_{qd}$ [−] are the dimensionless quantities that are generally used in the chemical engineering field and are defined as follows.

$$Q=N_{qd}\cdot N\cdot D^3 (Q\text{: flow rate, } N\text{: number of rotations, } D\text{: mixer diameter})$$

$$P=N_p\cdot \rho\cdot N^3\cdot D^5 (\rho\text{: density, } N\text{: number of rotations, } D\text{: mixer diameter})$$

Namely, the number of flow rates and the number of powers are the dimensionless quantities that can be derived from the flow rates and powers measured on the experimental basis.

Specifically, the value for the configuration dependent term $K_c$ for the entire mixer is specific to each of the mixers, and can be obtained by measuring the respective sizes of the rotor-stator and the power and flow rate during the mixer running period.

Accordingly, the performance of the mixers of the various types can then be estimated by comparing (estimating) the magnitude of the above values.

Specifically, the present invention allows the total energy dissipation rate $\epsilon_a$ to be obtained from the Equation of the present invention as described above, and the performance of the mixer may then be estimated by estimating the magnitude of the value for the configuration depending term of the entire mixer that is specific to each of the mixers and can be obtained by measuring the respective sizes of the rotor-stator and the power and flow rate during the running time which are included as components of the Equation.

According to the scale up or scale down method for the mixer of the rotor-stator type as proposed by the present invention, furthermore, the scale up or scale down may be performed by comparing the value for the total energy dissipation rate $\epsilon_a$ that may be obtained from the above Equation 1 on the experimental machine installation and/or the pilot plant machine installation with the value for the total energy dissipation rate $\epsilon_a$ that may be obtained on the actual machine installation to be scaled up or scaled down and matching those values.

More specifically, the total energy dissipation rate $\epsilon_a$ that may be obtained from the above Equation 1 of the present invention represents the total energy dissipation rate $\epsilon_a$ that may occur in the mixing section of the mixer of the rotor-stator type comprising the mixer unit which includes the stator having a plurality of openings (holes) and the rotor disposed on the inners side of the stator and spaced by the particular gag δ away from the stator.

In the experiments that were conducted by the inventors of the present application, it becomes clear that the particle size breakup effect (particle size breakup trend) can be discussed (compared or estimated) systematically or consistently by applying the total energy dissipation rate $\epsilon_a$ that may be obtained from the above Equation, although there may be differences in the rotor's configuration, the stator's configuration, the mixer's running condition (processing time, etc.), and/or the mixer's scale (size).

The total energy dissipation rate $\epsilon_a$ may be expressed in terms of the sum of the local shear stress $\epsilon_g$ for the gap between the rotor and stator and the local energy dissipation rate $\epsilon_s$ for the stator, as expressed by the above Equation 1.

In the experiments that have been conducted by the inventors of the present application, it has been discovered that the performance of each of the mixers of the different types can be compared (estimated) by estimating the magnitude of the configuration dependent term $K_c$ as one of the components included in the Equation for deriving the total energy dissipation rate $\epsilon_a$.

The value for the configuration dependent term $K_c$ for the entire mixer is specific to each of the mixers and may be obtained by measuring the rotor-stator' size and the power and flow rate during the particular running time (e.g. the power and flow rate during the water running time). It has been discovered that the performance of each of the mixers of the various types can be estimated by comparing (estimating) the magnitude of the values. The present invention is thus based upon this discovery.

By examining the relationship (particle size breakup trend) between the total energy dissipation rate $\epsilon_a$ that may be obtained from the above Equation and the resulting drop diameters, and then by arranging the experimental results into the graphical chart with the total energy dissipation rate $\epsilon_a$ being plotted along the horizontal (X) coordinate axis, it is found that the change in the resulting drop diameters (particle size breakup trend for the drop diameters) can be represented (estimated) consistently.

Specifically, It may be appreciated from the below description as embodiment 2 that the relationship (particle size breakup trend) between the total energy dissipation rate: $\epsilon_a$ that can be obtained by the Equation 1 of the present invention and the resulting liquid drop diameters can be represented (estimated) by plotting the above the total energy dissipation rate: $\epsilon_a$ along the X coordinate axis and grouping the changes in the liquid drop diameters (particle size breakup trend) together.

By the above examination conducted by the inventor of the present application, it has been recognized that there is a nearly linear relationship between the total energy dissipation rate: $\epsilon_a$ that can be obtained by the Equation of the present invention as described and the resulting liquid drop diameters.

Because it is difficult to derive the experimental equation that can be trusted statistically, the estimation of the liquid drop diameters has been made by using the relationship between the liquid drop diameters obtained experimentally and the total energy dissipation rate: $\epsilon_a$ obtained by the Equation of the present invention.

As described above, the total energy dissipation rate: $\epsilon_a$ obtained by the Equation of the present invention may be divided into the configuration dependent terms and other manufacturing conditions (including the time). The total energy dissipation rate: $\epsilon_a$ will become larger as the configuration dependent term (time) with the manufacturing condition term being fixed is larger. The result is that the liquid drop diameters will be smaller under the same manufacturing condition (time).

As this is described specifically, the particle size diameters can actually be measured under certain manufacturing condition, and the value for $\epsilon_a$ can then be calculated. By this experiment, the value for $\epsilon_a$ that is required for obtaining the particular liquid drop diameters can be determined.

By comparing the value for $\epsilon_a$ obtained when the mixer's configuration has been changed and the magnitude for $\epsilon_a$ before the mixer's configuration will be changed, the trend of decreasing the liquid drop diameter after the mixer's configuration has been changed will be able to be estimated.

Although the equation described before and the experimental equation that can be highly trusted statistically are not available, it will be possible to estimate the trend of decreasing the liquid drop diameters by considering the effect of the mixer's configuration on the liquid drop diameters.

In the method for manufacturing the foods (including the dairy products, drinks, etc.), pharmaceutical medicines (including the quasi-drugs, etc.) or chemical products (including the cosmetics) by subjecting the fluid or liquid being processed to the emulsification, dispersion, particle size breakup, mixing or any other similar process by utilizing the mixer of the rotor-stator type, the foods, pharmaceutical medicines or chemical products which have the desired drop diameters can be manufactured by calculating the total energy dissipation rate $\epsilon_a$ from the above Equation of the present invention and then estimating the mixer's running time and the resulting drop diameters of the fluid or liquid being processed that can be obtained during the mixer's running time.

It is demonstrated by the embodiments of the present invention that nutritive components (which are equivalent to the components such as liquid foods, the powder milks prepared for babies and the like) which have been manufactured according to the present invention have the good taste feeling, physical properties, quality and the like, and are also excellent from the standpoint of the hygiene care or workability. It is therefore preferable that the present invention should be applied to the manufacture of the foods or pharmaceutical medicines. It is more preferable that it should be applied to the manufacture of the foods. It is further preferable that it should be applied to the manufacture of the nutritive components or dairy products. It is most preferable that it should be applied to the manufacture of the nutritive components or dairy products that contain the highly concentrated composition.

As described above, the present invention provides the performance estimation method that can be applied to each of the mixers having the various types and configurations, particularly the mixers of the rotor-stator type that have the various configurations and circulation modes, and in which the running conditions for those mixer is taken into consideration.

The present invention also provides the scale up/scale down method that can be applied to each of the mixers having the various configurations, and takes the running conditions for those mixers into consideration.

Furthermore, the present invention provides the method for manufacturing the foods, pharmaceutical medicines or chemical products, and more specifically, the present invention provides the particle size breakup method that utilizes the performance estimation method and/or the scale up/scale down method that have been described above.

Now, the present invention will be described with respect to several preferred embodiments of the present invention by referring to the accompanying drawings. It should be understood, however, that the present invention is not restricted to those embodiments. Rather, the present invention may be modified in various ways or forms without departing from the spirit or scope as defined in the appended claims.

Embodiment 1

A liquid that is provided for simulating a dairy product is prepared as an object of estimating its particle size breakup. This liquid that simulates the dairy product contains the milk protein concentration (MPC, TMP (total milk protein)), rapeseed oil, and water. Its composition and ratio are presented in Table 1.

TABLE 1

Composition Ratio of Simulated Liquid for Milk Product

| | | |
|---|---|---|
| Composition | Milk Product Concentrate (MPC) | 8.0% |
| | Rape Seed Oil | 4.5% |
| | Water | 87.5% |
| | Total. | 100% |
| Ratio | Protein/Water | 9.1% |
| | Oil/Protein | 56.3% |
| | Oil/Water | 5.1% |
| Properties | Density | 1028 kg/m$^3$ |
| | Viscosity | 15 mPa · s |

The mixer performance was estimated by checking the particle size breakup trend for the drop diameters on the experimental basis. The unit that employs the external circulation system as shown in FIG. 3 was provided, and the drop diameters were measured on the middle way of the fluid or liquid path by using the laser diffraction-type particle size analyzer (SALD-2000 as offered by Shimazu Manufacturing Company).

In the present invention, however, it is found that as far as the internally circulated mixer in particular is concerned, it is difficult to grasp the particle size breakup trend for the drop diameters when the particle size breakup trend for the drop diameters is examined on the experimental basis and the mixer performance is then estimated. It is noted, however, that for the internally circulated mixer and the externally circulated mixer, they are common in that either of those mixers comprises the mixer unit 4 which includes the stator 2 having the plurality of openings (holes) 1 and the stator which is disposed on the inner side of the status 2 and spaced by the particular gap δ away from the stator 2, as shown in FIG. 1. When the performance of the internally circulated mixer was then estimated, this was done by using the results obtained by estimating the externally circulated mixer, under the assumption that the internally circulated mixer comprises the same mixer unit as the externally circulated mixer which included the rotor and stator each having the same dimension (size), configuration and structure as the externally circulated mixer as shown in FIG. 4.

In this embodiment, the respective performances for the three mixers were compared, in which the gap δ between the rotor 3 and the stator 2 was small (δ≤1 mm, e.g. δ=0.05 to 0.5 mm), and the number of openings (holes) 1 for the stator 2 was fewer (the number of opening 1=$n_a$≤20, e.g. $n_s$=1 to 10). The summary of the mixers that ware used here is given in Table 2.

TABLE 2

Summary of Mixer

| | | | Mixer A-1 1.5 L | Mixer A-2 1.5 L | Mixer B 9 L |
|---|---|---|---|---|---|
| | | | Stator No. | | |
| | | | 6 | 6 | 7 |
| Rotor Diameter | [mm] | D | 30 | 30 | 57 |
| Maximum Number of Rotations | [rpm] | $N_{max}$ | 26000 | 26000 | 8400 |
| Maximum Motor Driving Power | [kW] | $P_{g,max}$ | 0.9 | 0.9 | 1.5 |
| Number of Openings | [—] | $n_s$ | 3 | 6 | 5 |
| Size of Gap | [mm] | δ | 0.15 | 0.25 | 0.25 |
| Volume of Gap | [m³] | $v_g$ | $3.56 \times 10^{-8}$ | $5.96 \times 10^{-8}$ | $2.70 \times 10^{-7}$ |

Number of Rotor's Blades $n_r$: 4

The mixers A-1 and A-2 are offered from the same manufacture, and have the same capacity of 1.5 although they have the different sizes.

In Table 2, the gap volume $v_g$ corresponds to the volume of the gap δ in FIG. 1.

The number of the agitating blades for the rotor 3 that is included in each of the mixers A-1 and A-2 (each having the capacity of 1.5 liters) and B (having the capacity of 9 liters) is four for the mixer A-1, four for the mixer A-2, and four for the mixer B.

The experimental conditions and the calculated values of the total energy dissipation rate $\epsilon_a$ that was calculated under the experimental conditions are given in Table 3.

From the values of the total energy dissipation rate $\epsilon_a$ presented in Table 3, it was estimated that the particle size breakup effect would become higher as the gap δ in the mixer is narrower and as the number of rotations for the stator is greater.

For the mixer A-1 and mixer A-2 in Table 2, the relationship (the particle size breakup trend) between the processing (mixing) time under the mixer running conditions and the resulting drop diameters in Table 3 is then presented in FIG. 5.

The particle size breakup effect (particle size breakup performance) will exhibit the same trend as the values to be estimated by the total energy dissipation rate $\epsilon_a$ (theoretical values) in Table 3, and it is found that the particle size breakup effect (particle size breakup performance) will become higher as the gap δ in the mixer is smaller for all numbers of rotations. When it is thought that the processing (mixing) time under the running conditions is adequate, however, it is found that the speed of the rotor tip should be 15 m/s, preferably more than 17 m/s, more preferably more than 20 m/s, much more preferably more than 30 m/s, and most preferably more than 40 to 50 m/s.

Note, however, that when the experimental results are arranged or organized into the graphical chart with the processing (mixing) time being plotted along the X coordinate axis, it is found that the change in the drop diameter (particle size breakup trend) cannot be expressed (estimated) consistently.

Figure 6:
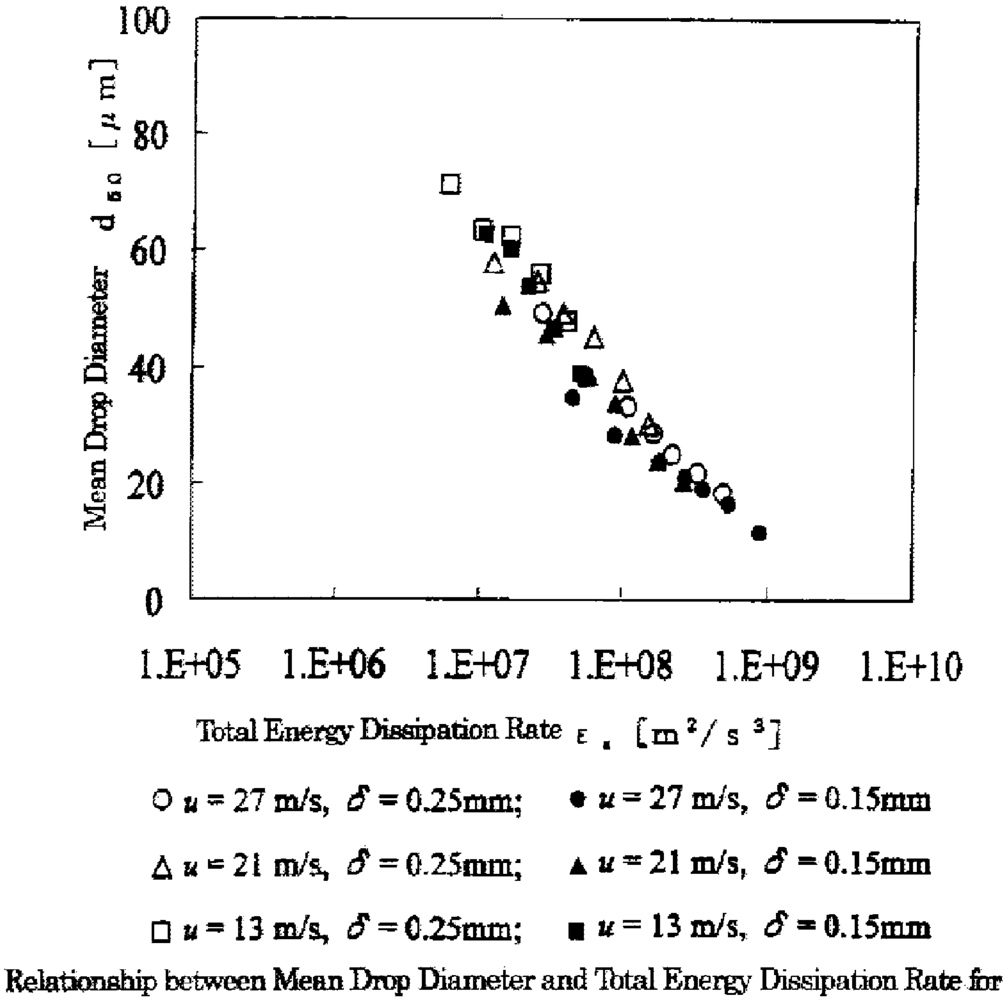
FIG. 6 represents the relationship (particle size breakup trend) between the total energy dissipation rate $\epsilon_a$ and the resulting drop diameters for the small-scale mixer.

For the mixers A-1 and A-2 in Table 2, however, the relationship (particle size breakup trend) between the total energy dissipation rate $\epsilon_a$ as proposed by the present invention and the resulting drop diameters is presented in FIG. 6. When the experimental results are arranged or organized into the graphical chart with the total energy dissipation rate $\epsilon_a$ being plotted along the X coordinate axis, it is found that the change in the drop diameter (particle size breakup trend) can be expressed (estimated) consistently.

Specifically, it is found that the drop diameter exhibits the similar trend in which the drop diameter will become smaller, regardless of the differences in the running condition (the number of rotations, the mixing time) and the mixer configuration (the gap δ, the diameter of the rotor 3).

TABLE 3

Experimental Conditions and Calculated Values

| | | | Stator No. | | |
|---|---|---|---|---|---|
| | | | Mixer A-1 | Mixer A-2 | Mixer B |
| Speed of Rotation | N | [rpm] | 17000<br>13600<br>8400 | 17000<br>13600<br>8400 | 8400<br>6720 |
| Speed of Rotor's Tip | u | [m/s] | 26.8<br>21.4<br>13.2 | 26.6<br>21.3<br>13.2 | 25.1<br>20.0 |
| Ratio of Configuration Dependent Term | $K_g/(K_g + K_s)$ | [—] | 0.86<br>0.87<br>0.87 | 0.81<br>0.79<br>0.83 | 0.94<br>0.94 |
| Total Energy Dissipation Rate | $\epsilon_a$ | [m²/s³] | $14.8 \times 10^5$<br>$4.81 \times 10^5$<br>$0.92 \times 10^5$ | $9.03 \times 10^5$<br>$2.07 \times 10^5$<br>$0.34 \times 10^5$ | $7.62 \times 10^5$<br>$1.25 \times 10^5$ |

In Table 3, it is shown that the value of $K_g/(K_g+K_s)$ is equal to more than 0.5. This means, therefore, that $K_g$ that is the configuration dependent term for the gap is greater than the configuration dependent term $K_s$ for the stator. When the particle size breakup effects for the gap and opening (hole) portion 1 in the stator 2 are then compared for the mixers A-1, A-2 and B, it is found that the particle size breakup effect for the mixer gap δ is greater and dominating.

That is, it is confirmed that the total energy dissipation rate $\epsilon_a$ can serve as the index for estimating the mixer's performance when the differences in the running condition and configuration for the mixer of the rotor-stator type are taken into account consistently.

Figure 7:
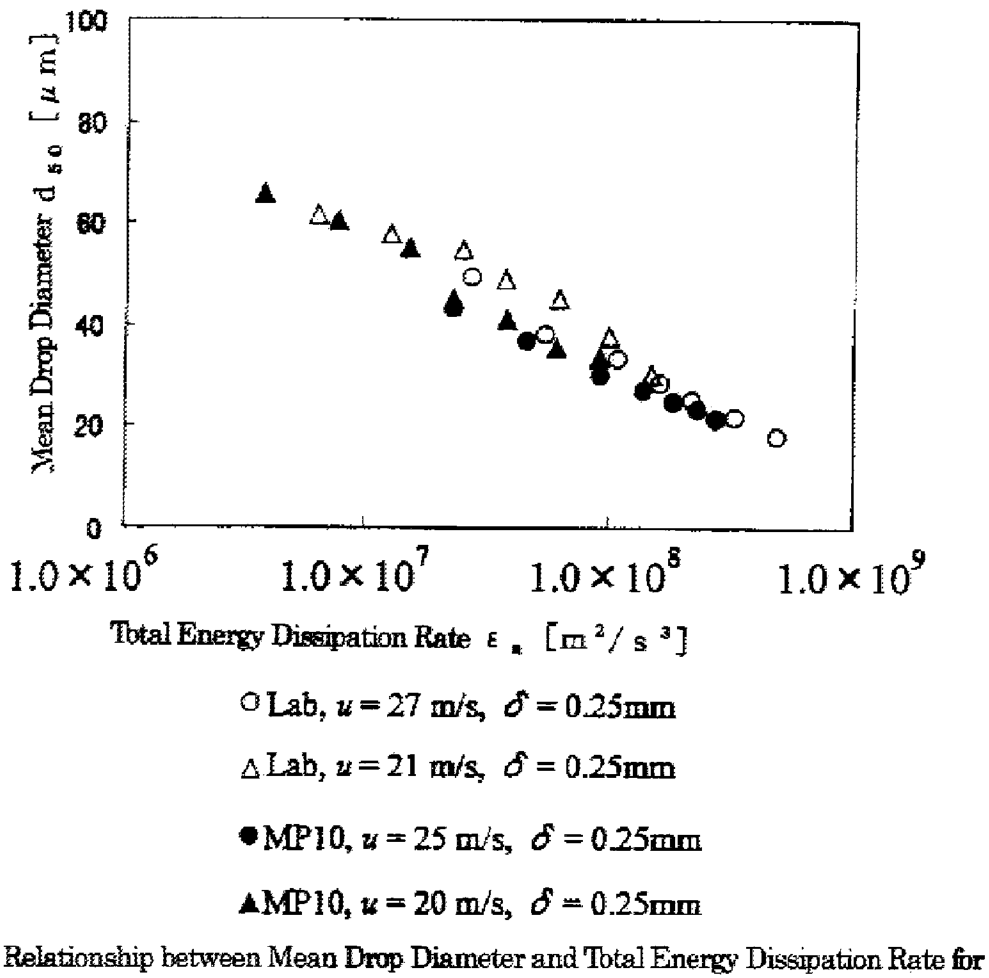
FIG. 7 represents the relationship (particle size breakup trend) between the total energy dissipation rate $\epsilon_a$ and the resulting drop diameters in the large-scale mixer.

For the mixer B in Table 2, the relationship (particle size breakup trend) between the total energy dissipation rate $\epsilon_a$ proposed by the present invention and the resulting drop diameters is presented in FIG. 7. From this relationship, it is found that the drop diameter depends largely upon the value (magnitude) of the total energy dissipation rate $\epsilon_a$ regardless of the difference in the mixer's scale (size).

From FIG. 6 and FIG. 7, it is also found that the particle size breakup will exhibit the similar trend regardless of the difference in the mixer's scale.

For the mixer of the rotor-stator type in which the gap δ between the rotor 3 and stator 2 is small (δ≤1 mm, e.g. δ=0.05 to 0.5 mm), and the number of openings (holes) 1 for the stator 2 is small ($n_s$≤20, e.g. $n_s$=1 to 10), it can be thought that the mixer can be scaled up or scaled down by agreeing with the values (magnitudes) for the total energy dissipation rate $\epsilon_a$ that can be obtained from the Equation 1 of the present invention and considering the differences in the running condition and configuration.

As it has been confirmed in this embodiment, the change in the drop diameters (particle size breakup trend for the drop diameter) can be represented (compared) consistently when the experimental results are arranged into the graphical chart with the total energy dissipation rate $\epsilon_a$ being plotted along the X coordinate axis. When the foods, pharmaceutical medicines or chemical products are manufactured by subjecting the fluid or liquid being processed to the emulsification, dispersion, particle size breakup, mixing or any other similar process using the mixer of the rotor-stator type as it was done in this embodiment, the foods, pharmaceutical medicines or chemical products that have the desired drop diameters can be manufactured by using the Equation of the present invention so that the mixer's running time and the resulting drop diameters obtained for the fluid or liquid being processed during the mixer's running time can be estimated.

Embodiment 2

In this embodiment, the performance was compared for the three mixers in which the gap δ between the rotor 3 and stator 2 is large (δ>1 mm, e.g. δ=2 to 10 mm), for example, and the number of openings (holes) 1 for the stator 2 is large ($n_s$>20, e.g. $n_s$=50 to 5000), for example.

Like the preceding embodiment 1, the liquid that is provided for simulating the dairy product having the composition shown in Table 1 was used as the object of estimating the particle size breakup, and the externally circulated mixer unit was provided as shown in FIG. 3 in which the drop diameters were measured on the middle way of the fluid or liquid path by using the laser diffraction-type particle size analyzer (SALD-2000 as offered by Shimazu Manufacturing Company), and the particle size breakup trend for the drop diameters were examined and estimated.

The mixer C (having the capacity of 100 liters), the mixer D (having the capacity of 500 liters), and the mixer E (having the capacity of 10 kiloliters) ware used in this embodiment, and the summary for those three mixers is presented in Table 4. Those three mixers are offered from the same manufacturers, and are available on the commercial market. For the mixer C, five mixers (Stator No. 1 to Stator No. 5), each of which is different in the size of the gap δ and the number of openings 1, were examined.

TABLE 4

Summary of Mixers

| | | | Mixer C 100 L | | | | | Mixer D 500 L | Mixer E 10 kL |
|---|---|---|---|---|---|---|---|---|---|
| | | | Stator No. | | | | | | |
| | | | 1 | 2 | 3 | 4 | 5 | 6 | 7 |
| Rotor's Diameter | [mm] | D | 198 | 198 | 198 | 198 | 198 | 198 | 396 |
| Stator's Opening Diameter | [mm] | d | 4 | 4 | 4 | 4 | 1 | 4 | 4 |
| Ratio of Opening | [—] | A | 0.11 | 0.20 | 0.31 | 0.26 | 0.12 | 0.26 | 0.18 |
| Number of Openings | [—] | $n_s$ | 173 | 316 | 500 | 411 | 3090 | 414 | 1020 |
| Size of Gap | [mm] | δ | 2 | 2 | 2 | 1 | 1 | 1 | 2 |

Number of Rotor Blades $n_r$: 6

In Table 4, it is noted that the opening aria ratio A is the dimensionless quantity that is measured in terms of the "all opening area ratios (=one hole area×number of holes)/stator's surface area".

The experimental conditions and the values calculated for the total energy dissipation rate $\epsilon_a$ under the running condition are presented in Table 5.

TABLE 5

Experimental Conditions and Calculated Values

| | | | Stator No. (Mixer C) | | | | |
|---|---|---|---|---|---|---|---|
| | | | 1 | 2 | 3 | 4 | 5 |
| Configuration Dependent Term | $K_c$ | [m$^5$] | $3.52 \times 10^{-3}$ | $8.51 \times 10^{-3}$ | $1.43 \times 10^{-3}$ | $1.54 \times 10^{-2}$ | $3.14 \times 10^{-2}$ |
| Ratio of Configuration Dependent Term | $K_c/K_{e\_std}$ | [—] | 0.23 | 0.55 | 0.93 | 1.00 | 2.04 |
| Total Energy Dissipation Rate | $\epsilon_a$ | [m$^2$/s$^3$] | $6.67 \times 10^3$ | $19.8 \times 10^3$ | $33.1 \times 10^3$ | $35.6 \times 10^3$ | $73.0 \times 10^3$ |

N = 1317 [rpm],
V = 0.1 [m$^3$]

Since the values for $Kg/(K_g+Ks)$ range between 0.1 and 0.3 as seen from Table 5, the configuration dependent term $K_s$ for the stator will be greater than the configuration dependent term $K_g$ for the gap. For the mixer C in Table 4, therefore, it is found that the particle size breakup effect for the opening portion 1 on the stator 2 is greater and more dominating.

As it is clear from the value for $K_c/K_{c\_std}$ which is normalized by $K_c$ for the stator No. 4 in Table 5, it can be estimated that the particle size breakup effect will become higher as the number of the stator is greater.

Figure 8:
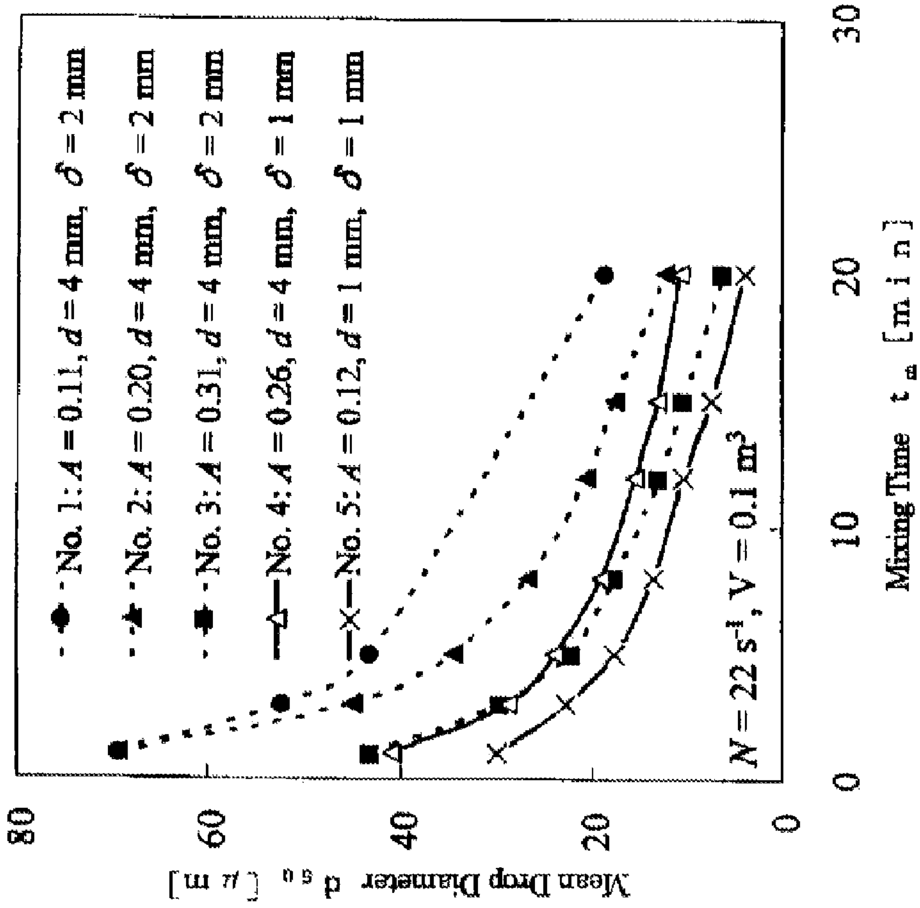
FIG. 8 represents the relationship (particle size breakup trend) between the processing (mixing) time and the resulting drop under the running conditions in Table 5 for the small-scale mixer.

For the mixer C (Stator No. 1-Stator No. 5), the relationship (particle size breakup trend) between the processing (mixing) time and the resulting drop diameters under the mixer running condition in Table 5 is shown in FIG. 8.

It is found that the particle size breakup effect (particle size breakup performance) exhibits the same trend as the values to be estimated by $K_c/K_{c\_std}$ in Table 5 and the particle size breakup effect, and is higher for any of Stator No. 1 to Stator No. 5 when the values for $K_c/K_{c\_std}$ are large. When the processing (mixing) time under mixer's running conditions is thought to be adequate, it is found that the area ratio of the opening is good when it is above 0.15 (15%), preferably above 0.2 (20%), more preferably above 0.3 (30%), much more preferably 0.4 (40%), or most preferably 0.4 to 0.5 (40 to 50%). Thus, it is better to consider the strength of the opening for the stator.

For the Stator No. 3 and Stator No. 4 that have the equivalent values for $K_c/Kc_{\_\_std}$, they show the equivalent particle size breakup trend. When the mixer's performance is estimated by the values for $K_c/Kc_{\_\_std}$ and the values for the total energy dissipation rate $\epsilon_a$ that can obtained by the Equation 1 of the present invention, therefore, it is found that the trend can be explained not only quantitatively but also qualitatively.

When the experimental results are arranged into the graphical chart with the processing (mixing) time being plotted along the X coordinate axis, it is found that the change in the drop diameters (particle size breakup trend for the drop diameters) cannot be expressed (estimated) consistently.

Figure 9:
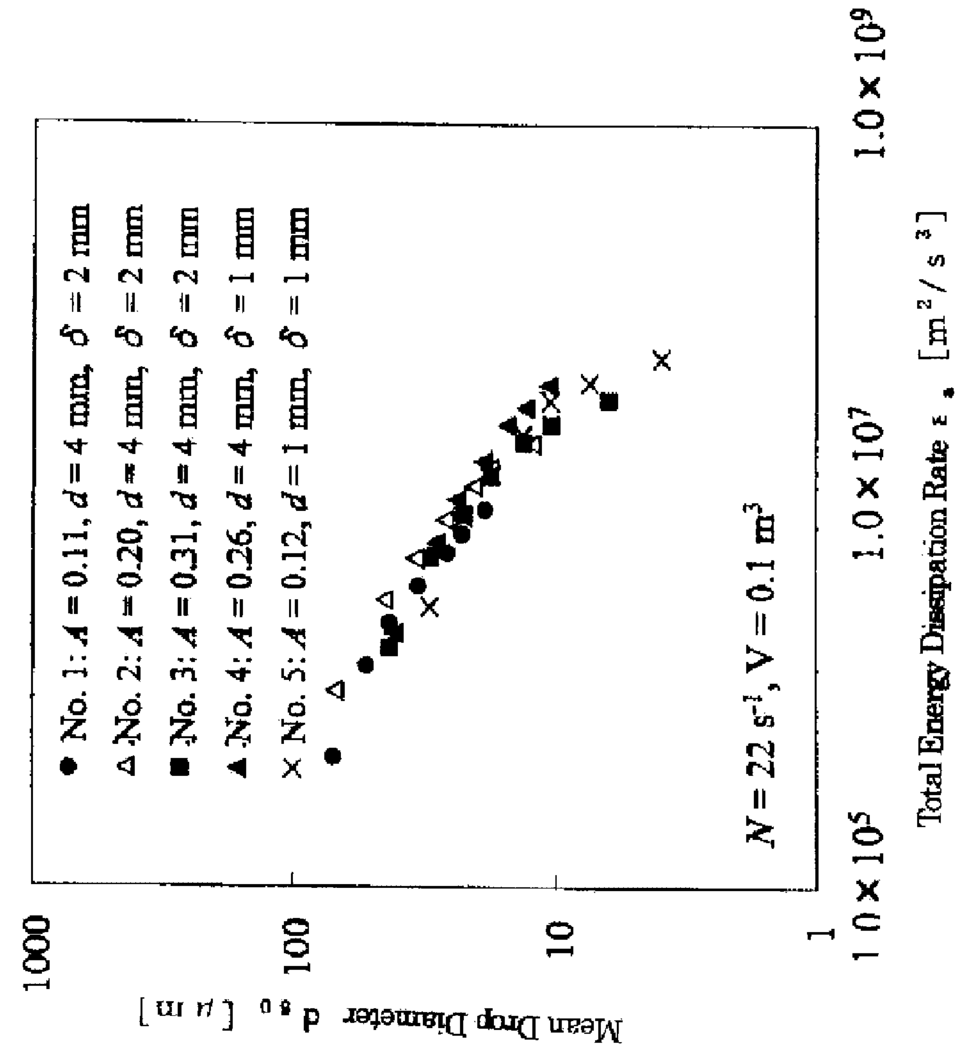
FIG. 9 represents the relationship (particle size breakup trend) between the total energy dissipation rate $\epsilon_a$ and the resulting drop diameters under the running conditions in Table 5 in the large-scale mixer.

Now, for the mixer C (Stator No. 1 to Stator No. 5) in Table 4, the relationship (particle size breakup trend) between the total energy dissipation rate $\epsilon_a$ to be obtained by the Equation 1 and the resulting drop diameters is presented in FIG. 9.

When the experimental results are arranged or organized into the graphical chart with the processing (mixing) time being plotted along the X coordinate axis, it is found that the change in the drop diameters (particle size breakup trend for the drop diameters) can be represented (estimated) consistently. As this is explained specifically, it is found that the drop diameter follows the similar trend and is decreasing, even though there are differences in the mixer's running condition (the number of rotations, mixing time) and the configuration of the mixer (gap, stator's hole diameter, stator's opening area ratio).

That is, it has been confirmed that the total energy dissipation rate $\epsilon_a$ that can be obtained by the Equation 1 of the present invention may serve as the index that can be used to estimate the mixer of the rotor-stator type in particular, when the differences in the mixer's running condition and configuration are considered consistently.

Figure 10:
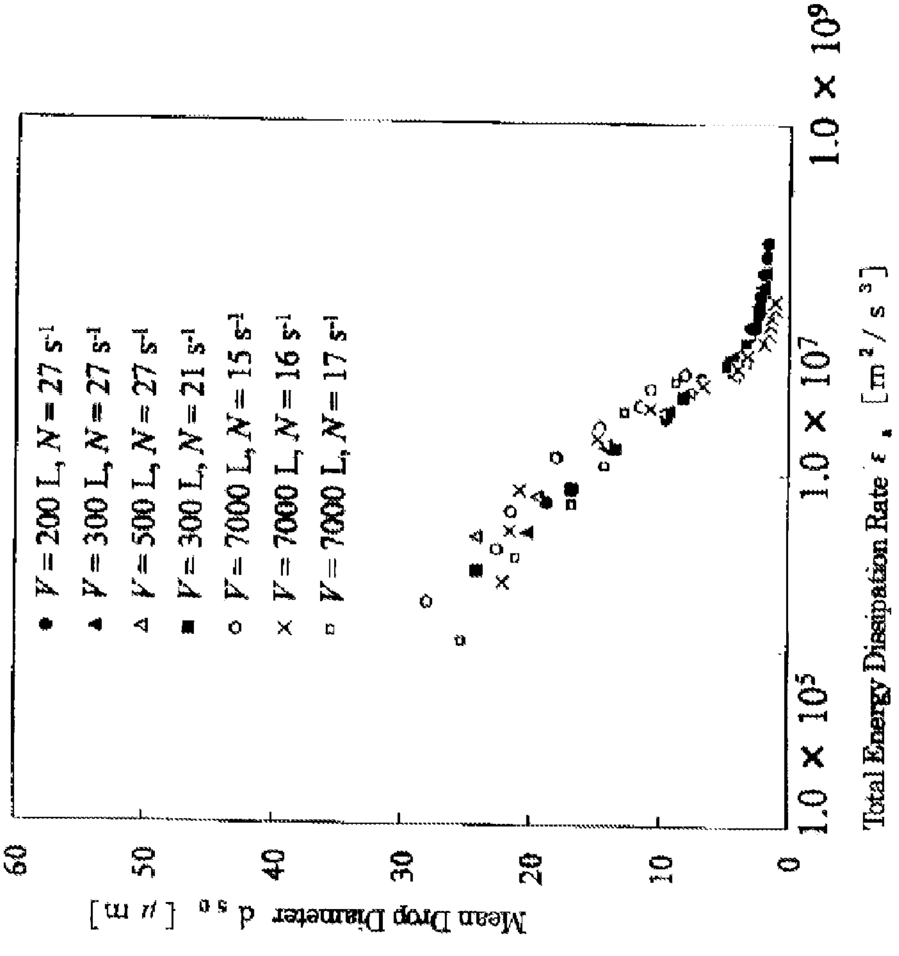
FIG. 10 represents the relationship (particle size breakup trend) between the total energy dissipation rate $\epsilon_a$ and the resulting drop diameters in another large-scale mixer.

For the mixers D and E in Table 4, the relationship (particle size breakup trend) between the total energy dissipation rate $\epsilon_a$ that can be obtained by the Equation of the present invention and the resulting drop diameters is presented in FIG. 10. It is found that the drop diameter depends on the value (magnitude) for the total energy dissipation rate E a even though the scale (size) of the mixer may have the different capacity such as 200 to 700 liters. The drop diameter has the similar trend even though the scale (size) of the mixer is different.

For the mixers of the rotor-stator type in which the gap $\delta$ between the rotor 3 and stator 2 is larger ($\delta$>1 mm, e.g. $\delta$=2 to 10 mm), and the number of openings (holes) 1 for the stator 2 is larger ($n_s$>20, e.g. $n_s$=50 to 5000), it can be thought from the above that those mixers can be scaled up by agreeing with the values (magnitudes) of the total energy dissipation rate $\epsilon_a$ that can be obtained by the Equation 1 of the present invention and by considering that there are the differences in the mixer's running condition and configuration consistently.

In the current embodiment 2 like the preceding embodiment 1, furthermore, when the experimental results are arranged or organized into the graphical chart with the total energy dissipation rate $\epsilon_a$ obtained by the Equation of the present inventing being plotted along the X coordinate axis, it is also found that the change in the drop diameters (the particle size breakup trend for the drop diameter) can be expressed (estimated) consistently. Thus, when the foods, pharmaceutical medicines or chemical products are manufactured by subjecting the fluid or liquid being processed to the emulsification, dispersion, particle size breakup, mixing or any other similar process using the mixer of the rotor-stator type, the foods, pharmaceutical medicines or chemical products that have the desired drop diameters can be manufactured by calculating the Equation of the present invention in order to estimate the mixer's running time and the resulting drop diameters obtained for the fluid or liquid being processed during the mixer's running time.

Embodiment 3

The details of the scale up (scale down) method are now described below, in which the mixer's running time is considered, and the total energy dissipation rate $\epsilon_a$ that may be obtained by the Equation as proposed by the present invention is applied.

It can be said that it is essential in designing the actual manufacturing process to estimate the processing time (equivalent mixing time) that will be required for obtaining on the actual mixer installation the drop diameter that can be obtained on the pilot plant mixer installation. The procedure for estimating the equivalent mixing time will be described below on the basis of the valued presented in Table 6.

TABLE 6

Estimation of Equivalent Mixing Time

| | | | Pilot Plant Mixer Installation 500 L | Actual Mixer Installation 7000 L |
|---|---|---|---|---|
| Speed of Rotations | N | [l/g] | 27 | 17 |
| Speed of Rotor's Blade Tip | U | [m/g] | 17 | 22 |
| Total Energy Dissipation Rate | $\epsilon_a$ | [$m^2/g^3$] | $4.73 \times 10^4$ | $1.90 \times 10^4$ |
| Equivalent Mixing Time | $t_e$ | [min] | 1 | 2.49 |

On the pilot plant mixer installation (in which the mixer has the capacity of 500 liters), the total energy dissipation rate $\epsilon_a$ is $4.73\times10^4$ when the mixer rotates at the rate of 27/sec., while on the actual mixer installation (in which the mixer has the capacity of 7,000 liters), the total energy dissipation rate $\epsilon_a$ is $1.94\times10^4$ when the mixer rotates at the rate of 17/sec. In order to make the values for $\epsilon_a$ on the actual mixer installation equal to the value for $\epsilon_a$ on the pilot plant mixer installation, the processing (mixing) equal to 2.49 times would be required. Accordingly, the equivalent mixing time on the actual mixer installation may be estimated to be 2.49 times the equivalent mixing time on the pilot plant mixer installation.

Figure 11:
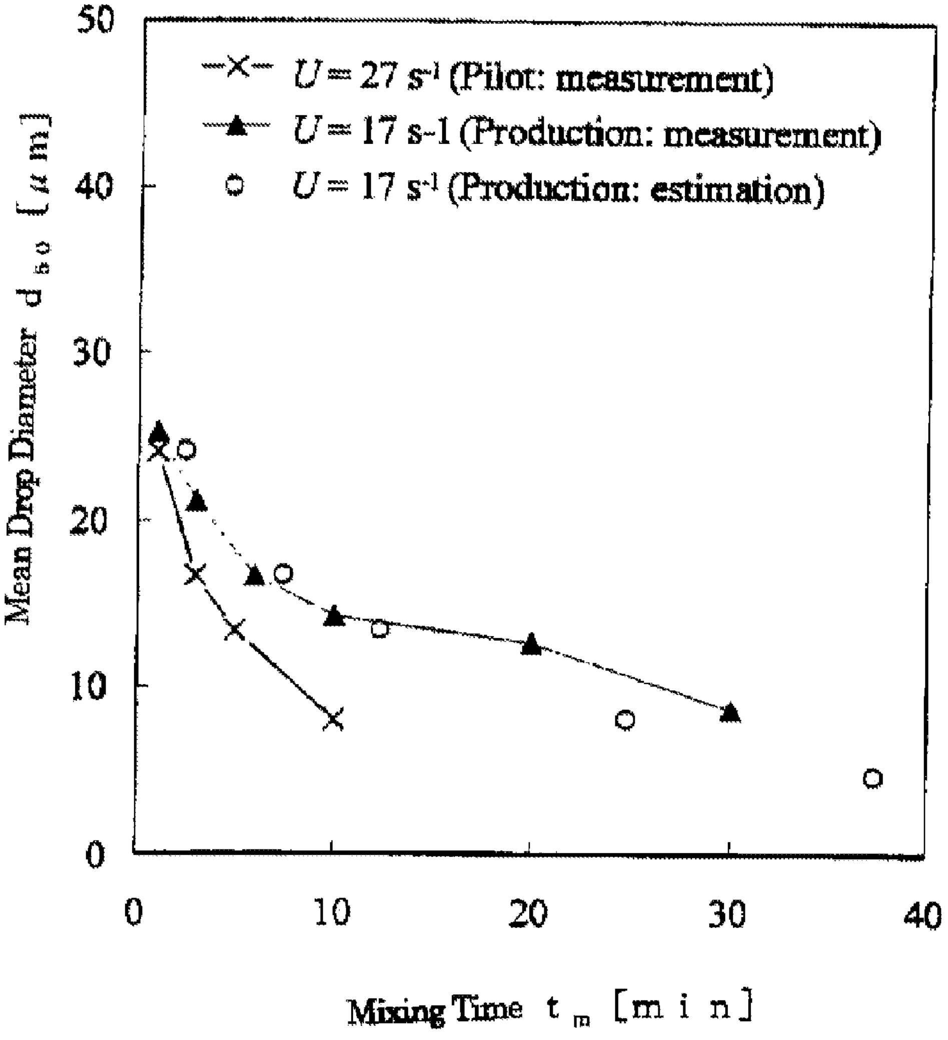
FIG. 11 is a diagram that shows the comparison between the processing time (equivalent mixing time) and the values measured actually on the practical production installation, wherein the processing time is the time required for obtaining the drop diameters on the actual production installation that would be obtained on the pilot plant installation to which the total energy dissipation rate $\epsilon_a$ was applied.

In order to make it sure that this estimation is adequate, the estimated values are compared with the actual measured values as shown in FIG. 11. From this comparison, it may be appreciated that the particle size breakup trend (particle size breakup effect) on the actual mixer installation that has been estimated from the actual measured values on the pilot plant installation is equal to the particle size on the actual mixer installation.

From the above, it is found that the mixer can be scaled up by applying the values for $\epsilon_a$ obtained from the Equation to estimate the mixer's performance and the mixer running time, considering that there may be differences in the mixer's configuration (scale).

The methods (theories) that are provided in the prior art can only be applied to those mixers in which the gap between the rotor and stator affects largely the particle size breakup effect or emulsification effect, or the methods (theories) that are provided in the prior art can only be applied to those mixers in which the opening (hole) on the stator affects the particle size breakup effect or emulsification effect. There are no methods (theories), however, that can be applied to the mixers of the various types in which the particle size breakup effect or emulsification effect are not affected by the gap or opening.

In accordance with the present invention, the performance estimation or scale up for the mixers which are dependent on the gap or opening can be performed by considering the particle size breakup effect or emulsification effect consistently. More specifically, the present invention allows for the development of the methods (theories) that can be applied to all possible types of mixers, based on the mixer's performance estimation method and scale up method, the uses of which have been restricted in the prior art.

Embodiment 4

The experiments on the particle size breakup effect ware conducted by using the nutrition conditioned foods (MEIBALANCE 1.0 HP (trademark) offered by Meiji Nyugyo Company. This nutrition conditioned foods have the composition and physical property as presented in Table 7.

TABLE 7

| Nutrition Conditioned Food (MEIBALANCE HP 1.0 (Trademark) | |
|---|---|
| Composition (100 mL) | |
| Energy [kcal] | 100 |
| Protein [g] | 5.0 |
| Fat [g] | 2.5 |
| Saccharide [g] | 14.1 |
| Dietary Fiber [g] | 1.2 |
| Ash [g] | 0.7 |
| Water [g] | 84.3 |
| Property Value | |
| Osmotic Pressure [mOsm/L] | 420 |
| pH (20° C.) [—] | 6.7 |
| Viscosity (20° C.) [mPa · s] | 10 |
| Specific Gravity (20° C.) [—] | 1.078 |

In this embodiment 4, the experiments were conducted by using two types of mixers (one has the capacity of 9 kiloliters and the other has the capacity of 400 liters), in which the rotor's number of rotations and the accumulated time were varied. Those two types of mixers are offered from the same manufacturer of the mixers A, B and C as in the embodiments 1 and 2.

The experimental conditions and the values calculated for the total energy dissipation rate $\epsilon_a$ are presented in Table 8.

TABLE 8

Experimental Conditions and Calculated Values (MEIBALACE HP 1.0)

| | | ϵa |
|---|---|---|
| 9 kL | 1050 rpm | 1.14E+06 |
| | 1200 rpm | 1.91E+06 |
| 400 L | 1500 rpm | 1.92E+06 |
| | 2040 rpm | 1.10E+07 |

| | Time [min] | d 50 [μm] | Accumulated Time [min] | ϵa [$m^2/s^3$] |
|---|---|---|---|---|
| 9 kL 1050 rpm | 40 | 1.013 | 40 | 4.56E+07 |
| | 5 | 0.771 | 45 | 5.13E+07 |
| | 5 | 0.742 | 50 | 5.70E+07 |
| | 7 | 0.691 | 57 | 6.50E+07 |
| | 15 | 0.619 | 72 | 8.21E+07 |
| 9 kL 1200 rpm | 7 | 13.8 | 7 | 1.34E+07 |
| | 5 | 2.37 | 12 | 2.29E+07 |
| | 8 | 1.2 | 20 | 3.82E+07 |
| | 5 | 0.925 | 25 | 4.78E+07 |
| | 5 | 0.807 | 30 | 5.74E+07 |
| | 5 | 0.751 | 35 | 6.69E+07 |
| | 5 | 0.696 | 40 | 7.65E+07 |
| | 10 | 0.642 | 50 | 9.56E+07 |
| 400 L 1500 rpm | 5.5 | 5.763 | 5.5 | 1.06E+07 |
| | 3 | 2.667 | 8.5 | 1.63E+07 |
| | 4 | 1.884 | 12.5 | 2.40E+07 |
| | 10 | 1.176 | 22.5 | 4.33E+07 |
| 400 L 2020 pm | 5.5 | 0.68 | 5.5 | 6.05E+07 |
| | 3 | 0.617 | 8.5 | 9.35E+07 |
| | 4 | 0.593 | 12.5 | 1.37E+08 |
| | 10 | 0.527 | 22.5 | 2.47E+08 |

Figure 12:
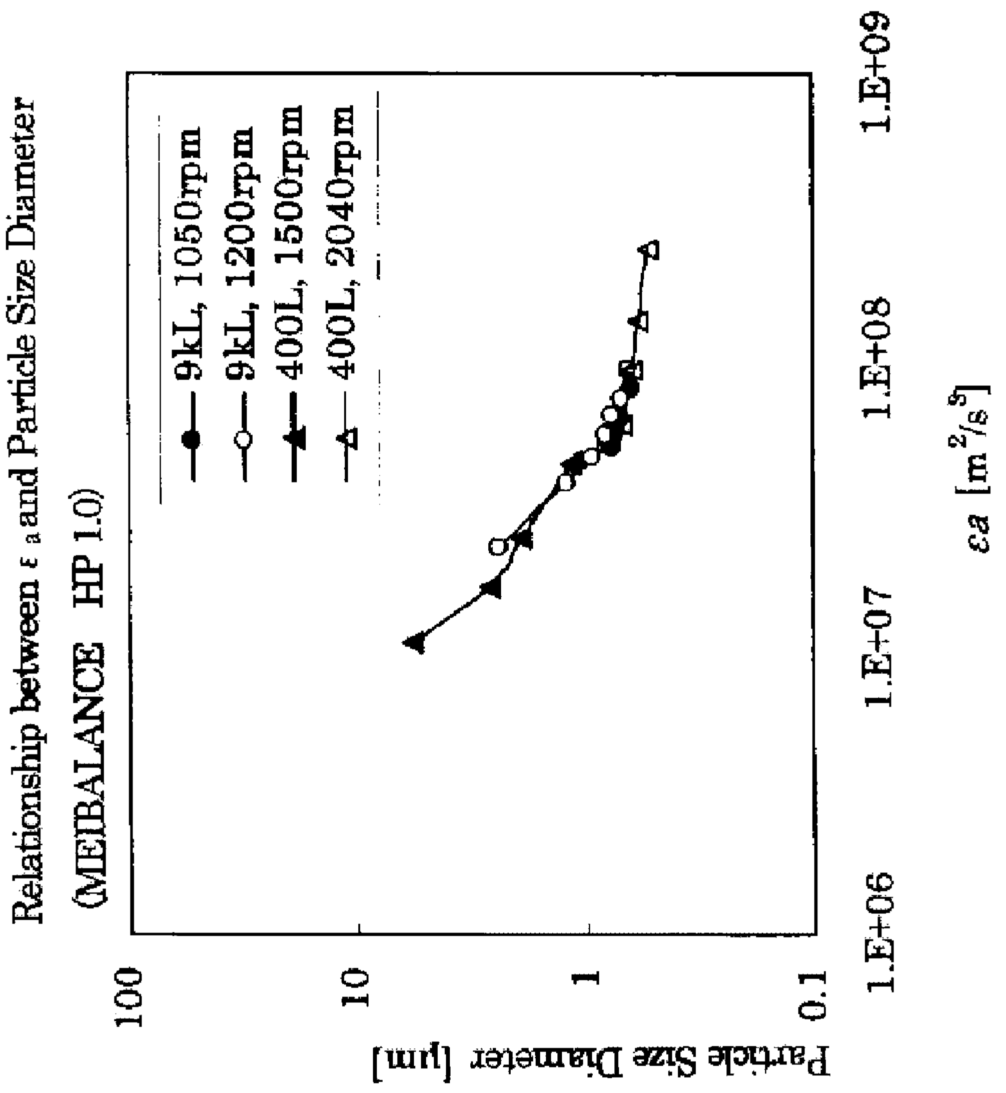
FIG. 12 represents the relationship (particle size breakup trend) between the total energy dissipation rate $\epsilon_a$ and the resulting drop diameters, where the nutrition conditioned foods are mixed by the mixer of the rotor-stator mixer that is commercially available.

The relationship (particle size breakup trend) between the total energy dissipation rate $\epsilon_a$ and the resulting drop diameters is presented in FIG. 12.

When the experimental results are arranged into the graphical chart with the total energy dissipation rate $\epsilon_a$ proposed by the present invention being plotted along the X coordinate axis, it has been found that the change in the drop diameter (particle size breakup trend for the drop diameters) can be represented (estimated) consistently.

The present invention proposes the mixer's performance estimation method and the mixer's scale up method (or scale down method) which provide the excellent and efficient functions that have been described heretofore, and those methods can be utilized in the various industry fields in which the emulsification, dispersion, particle size breakup, mixing or any similar process occurs. For example, the industry fields include the manufacturing fields in which foods, pharmaceutical medicine, chemical products and the like are manufactured.

(1) For the existing mixers of the rotor-stator type that are available on the commercial market, the performance of those conventional mixers can be estimated by allowing the mixers to run simply by using the usual water (which is called the water running operation) instead of using the actual processing liquid. By reviewing the water running operation that is useful in making such reviews, the most suitable mixer of the rotor-stator type that can meet the needs of each user can be chosen. In this way, the cost of choosing the mixer can be reduced, and the time required for making the review can be decreased.

(2) By adopting the geometrical size in such a manner that it can maximize the configuration dependent term of the total energy dissipation rate $\epsilon_a$, the performance enhancement as well as the mixer's improved design and manufacture can be provided for the novel mixers of the rotor-stator type according to the present invention, while the performance improvement can be achieved for the conventional and existing mixers.

(3) For the various mixers of the rotor-stator type that range from the small scale mixer to the large scale mixer, those mixers can be scaled up or scaled down efficiently by taking the processing (agitating) time required for the mixers into consideration.

(4) In order to achieve the particle size breakup effect (drop diameter) that meets the needs of each user, the good way is to estimate the processing (manufacturing) time required for this purpose, and then to run the mixer during as little time as it is required. In this way, the running time required for the mixers can be reduced, and the requirements for the energy can be saved accordingly.

What is claimed is:

1. A method for estimating the performance of a mixer of a rotor-stator type, wherein the method includes the steps of:

obtaining a total energy dissipation rate $\epsilon_a$ by using the Equation 1 given below;

measuring a size of the mixer and the power and flow rate during the mixer's running time which are components included in the Equation 1;

estimating a magnitude of values for the entire mixer that are specific to each of plural mixers and are obtained in the measuring step; and estimating the performance of the mixer:

$$\begin{aligned}\varepsilon_a &= \varepsilon_g + \varepsilon_s \\ &= [(N_p - N_{qd}\pi^2)\cdot n_r]\left\{D^3\left[\left(\frac{D^3 b}{\delta(D+\delta)}\right) + \frac{\pi^2 n_s^2 d^3(d+4l)}{4N_{qd}[n_s\cdot d^2 + 4\delta(D+\delta)]}\right]\right\}\left(\frac{N^4\cdot t_m}{V}\right) \\ &= [(N_p - N_{qd}\pi^2)\cdot n_r]\cdot[D^3(K_g+K_s)]\cdot\left(\frac{N^4\cdot t_m}{V}\right) \\ &= K_c\cdot\left(\frac{N^4\cdot t_m}{V}\right)\end{aligned} \qquad \text{Equation 1}$$

In the Equation 1, $\epsilon_a$: Total energy dissipation rate ($m^2/s^3$)

$\epsilon_g$: Local shear stress in the gap between the rotor and stator ($m^2/s^3$)

$\epsilon_s$: Local energy dissipation rate in the stator ($m^2/s^3$)

$N_p$: Number of powers (–)

Nqd: Number of flow rates (–)

$n_r$: Number of rotor blades (–)

D: Diameter of rotor (m)

b: Thickness of rotor blade tip (m)

δ: Gap between rotor and stator (m)

$n_s$: Number of stator holes (–)

d: Diameter of stator hole (m)

l: Thickness of stator (m)

N: Number of rotations (l/s)

$t_m$: Mixing time (s)

V: Flow rate ($m^3$)

$K_g$: Configuration dependent term ($m^2$)

$K_s$ Configuration dependent term in stator ($m^2$)

$K_c$: Configuration dependent term for the entire mixer.

2. A method of scaling up or scaling down a mixer of a rotor-stator type, wherein the method includes the steps of:

obtaining a value for a total energy dissipation rate $\epsilon_a$ on an experimental mixer installation and/or a pilot plant mixer installation by using the Equation 1 given below;

obtaining the value for the total energy dissipation $\epsilon_a$ measured on an actual mixer installation;

allowing the value $\epsilon_a$ obtained on the experimental mixer installation and/or pilot plant mixer installation to agree with the value$\epsilon_a$ measured on the actual mixer installation; and scaling up or scaling down the mixer:

$$\begin{aligned}\varepsilon_a &= \varepsilon_g + \varepsilon_s \\ &= [(N_p - N_{qd}\pi^2)\cdot n_r]\left\{D^3\left[\left(\frac{D^3 b}{\delta(D+\delta)}\right) + \frac{\pi^2 n_s^2 d^3(d+4l)}{4N_{qd}[n_s\cdot d^2 + 4\delta(D+\delta)]}\right]\right\}\left(\frac{N^4\cdot t_m}{V}\right) \\ &= [(N_p - N_{qd}\pi^2)\cdot n_r]\cdot[D^3(K_g+K_s)]\cdot\left(\frac{N^4\cdot t_m}{V}\right) \\ &= K_c\cdot\left(\frac{N^4\cdot t_m}{V}\right)\end{aligned} \qquad \text{Equation 1}$$

In the Equation 1, $\epsilon_a$: Total energy dissipation rate ($m^2/s^3$)

$\epsilon_g$: Local shear stress in the gap between the rotor and stator ($m^2/s^3$)

$\epsilon_s$: Local energy dissipation rate in the stator ($m^2/s^3$)

$N_p$: Number of powers (–)

Nqd: Number of flow rates (–)

$n_r$: Number of rotor blades (–)

D: Diameter of rotor (m)

b: Thickness of rotor blade tip (m)

δ: Gap between rotor and stator (m)

$n_s$: Number of stator holes (–)

d: Diameter of stator hole (m)

l: Thickness of stator (m)

N: Number of rotations (l/s)

$t_m$: Mixing time (s)

V: Flow rate ($m^3$)

$K_g$: Configuration dependent term ($m^2$)

$K_s$ Configuration dependent term in stator ($m^2$)

$K_c$: Configuration dependent term for the entire mixer.

3. A method for manufacturing the foods, pharmaceutical medicines or chemical products by subjecting a fluid or liquid being processed to an emulsification, dispersion, particle size breakup, mixing or any other similar process by using a mixer of a rotor-stator type, wherein the method includes the steps of:

calculating the Equation 1 given below to estimate a running time of the mixer and resulting drop diameters to be obtained for the fluid or liquid being processed during the mixer's running time; and manufacturing the foods, pharmaceutical medicines or chemical products:

$$\begin{aligned}\varepsilon_a &= \varepsilon_g + \varepsilon_s \\ &= [(N_p - N_{qd}\pi^2)\cdot n_r]\left\{D^3\left[\left(\frac{D^3 b}{\delta(D+\delta)}\right) + \frac{\pi^2 n_s^2 d^3(d+4l)}{4N_{qd}[n_s\cdot d^2 + 4\delta(D+\delta)]}\right]\right\}\left(\frac{N^4\cdot t_m}{V}\right) \\ &= [(N_p - N_{qd}\pi^2)\cdot n_r]\cdot[D^3(K_g+K_s)]\cdot\left(\frac{N^4\cdot t_m}{V}\right)\end{aligned} \qquad \text{Equation 1}$$

-continued $$= K_c \cdot \left( \frac{N^4 \cdot t_m}{V} \right)$$

In the Equation 1, $\epsilon_a$: Total energy dissipation rate ($m^2/s^3$)

$\epsilon_g$: Local shear stress in the gap between the rotor and stator ($m^2/s^3$)

$\epsilon_s$: Local energy dissipation rate in the stator ($m^2/s^3$)

$N_p$: Number of powers (–)

Nqd: Number of flow rates (–)

$n_r$: Number of rotor blades (–)

D: Diameter of rotor (m)

b: Thickness of rotor blade tip (m)

δ: Gap between rotor and stator (m)

$n_s$: Number of stator holes (–)

d: Diameter of stator hole (m)

l: Thickness of stator (m)

N: Number of rotations (l/s)

$t_m$: Mixing time (s)

V: Flow rate ($m^3$)

$K_g$: Configuration dependent term ($m^2$)

$K_s$ Configuration dependent term in stator ($m^2$)

$K_c$: Configuration dependent term for the entire mixer.

* * * * *